April 26, 1966     E. R. PLASKO     3,248,579
RECIPROCATING MOTOR WITH MOTION CONVERSION
Filed Aug. 12, 1963     2 Sheets-Sheet 1
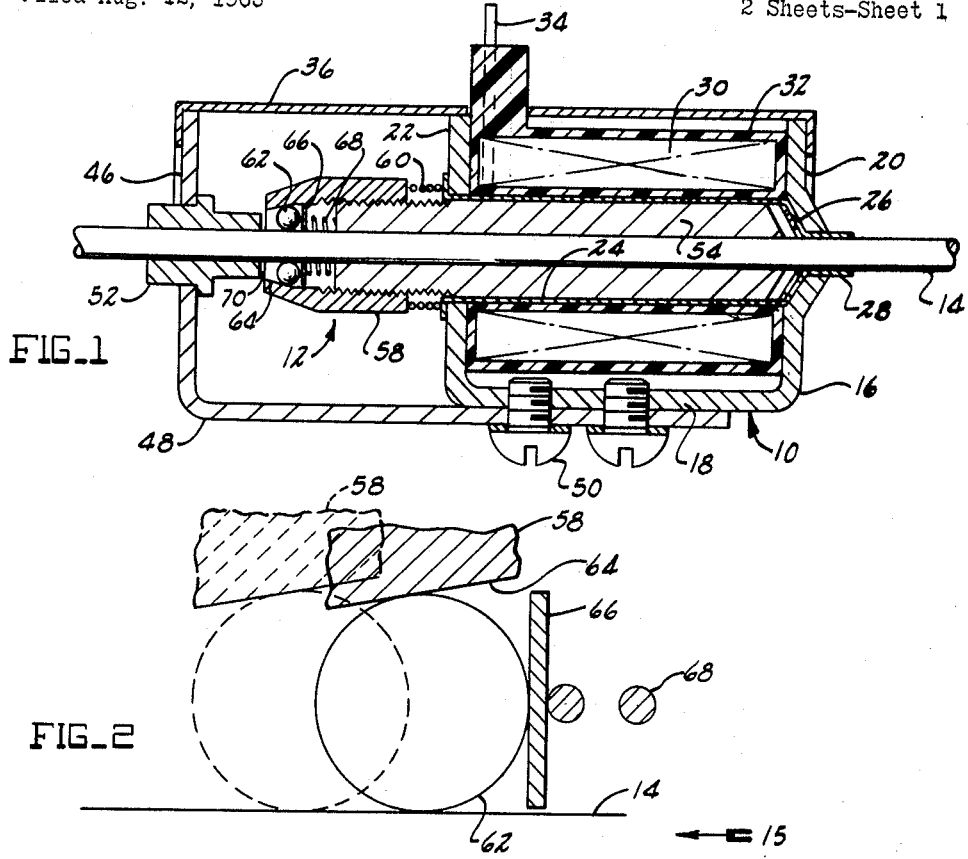
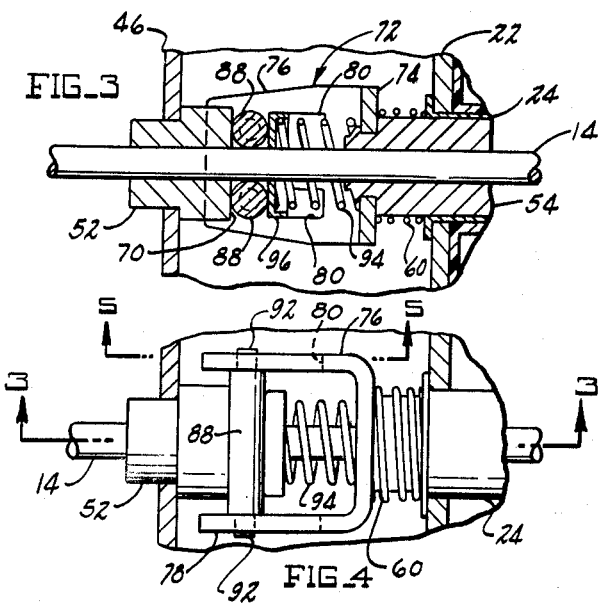
INVENTOR.
EMIL ROBERT PLASKO
BY
JOHN E. McRAE
ATTORNEY April 26, 1966  E. R. PLASKO  3,248,579
RECIPROCATING MOTOR WITH MOTION CONVERSION
Filed Aug. 12, 1963
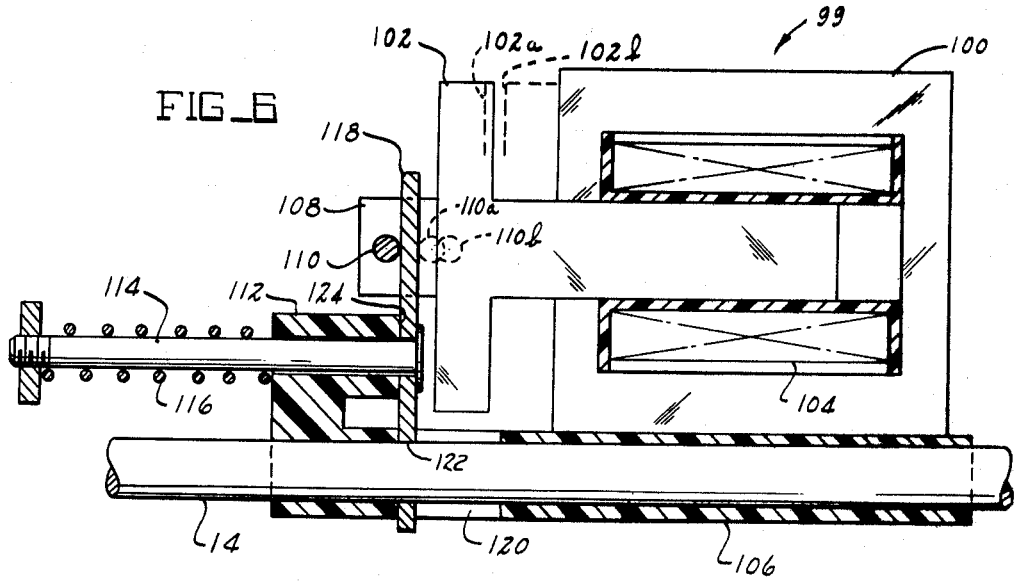
FIG_6
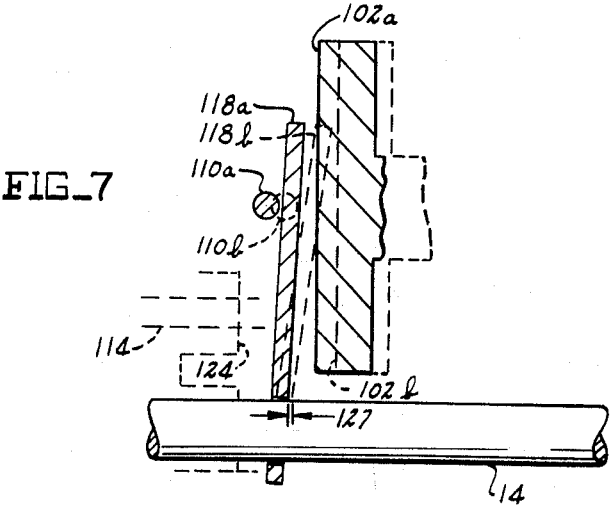
FIG_7
INVENTOR.
EMIL ROBERT PLASKO
BY
JOHN E. McRAE
ATTORNEY

United States Patent Office 3,248,579
Patented Apr. 26, 1966

3,248,579
RECIPROCATING MOTOR WITH MOTION CONVERSION
Emil Robert Plasko, Walled Lake, Mich., assignor to American Radiator & Standard Sanitary Corporation, New York, N.Y., a corporation of Delaware
Filed Aug. 12, 1963, Ser. No. 301,288
10 Claims. (Cl. 310—23)

This invention relates to an electrically energized power device, and particularly to a solenoid-powered device for producing rectilinear motion.

One object of the invention is to provide a solenoid-operated device capable of producing unlimited rectilinear motion, e.g., a two inch motion, or a three foot motion, etc.

A general object of the invention is to provide a solenoid-power device having an output member movable in one direction while the solenoid is energized and movable in the opposite direction when the solenoid is de-energized.

Other objects of this invention will appear from the following description and appended claims, reference being had to the accompanying drawings forming a part of this specification wherein like reference characters designate corresponding parts in the several views.

In the drawings:

FIGURE 1 is a sectional view of one embodiment of the invention taken on line 1—1 in FIG. 2;

FIG. 2 is a diagrammatic view illustrating the operation of the clutch mechanism employed in the FIG. 1 construction;

FIG. 3 is a fragmentary sectional view illustrating a clutch mechanism which can be employed in lieu of the clutch shown in FIG. 1;

FIG. 4 is a top plan view of the FIG. 3 clutch;

FIG. 5 is a fragmentary sectional view taken on line 5—5 in FIG. 4;

FIG. 6 is a sectional view taken through another embodiment of the invention; and FIG. 7 is a diagrammatic view illustrating the operation of the clutch mechanism employed in the FIG. 6 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

FIGURE 1 EMBODIMENT

The FIGURE 1 embodiment comprises a solenoid designated generally by numeral 10, a one-way clutch designated generally by numeral 12, and an output driven member in the form of a cylindrical rod 14 of hardened non-magnetic material.

Solenoid 10 comprises a U-shaped magnetic frame 16 having a web wall 18 and end walls 20 and 22. Extending between the end walls is a guide sleeve 24 which is preferably necked in at 26 and thence directed axially to provide a reduced diameter guide sleeve portion 28. Surrounding the sleeve 24 is a conventional electrical coil having its windings 30 encased in a dielectric molded sheathing 32. Suitable electrical terminals are provided at 34 for supplying the coil with alternating current. As shown in FIG. 1 the terminals project upwardly through a cover-like casing 36 which overlies both the solenoid and clutch 12. The left portion of the power device is closed by an angle member 48.

Member 48 may be suitably secured to frame 18 by screws 50. Preferably the upstanding wall portion 46 of member 48 is apertured to accommodate a tubular guide sleeve 52 for the output member 14. Thus, the output member is suitably guided at the two widely spaced areas 28 and 52. As shown in FIG. 1, the output member freely extends within and through a tubular armature 54.

The left end of the armature is threaded to accommodate an annular internally threaded clutch or drive housing 58, said housing being positioned to constitute an abutment for the left end of a coil spring 60. During operation, when an alternating current is supplied to coil 30 the armature is drawn from its illustrated position to the right during each half cycle and back to the left to its illustrated position by relatively heavy spring 60 during the other half cycle. There is thus provided a vibratory armature motion having a frequency corresponding to the frequency of the electric current.

As shown in FIGS 1, the aforementioned clutch 12 comprises an annular clutch housing 58 and six spherical anti-friction clutch elements 62 spaced about rod 14. The clutch housing is provided with a frustro-conical wedge or cam surface 64. Cooperating with wedge surface 64 is a floating annular plate 66 and relatively light compression spring 68. The components are arranged so that during the periods when armature 54 is being drawn into coil 30 spherical elements 62 are caused to tightly non-slippingly grip the wedge surface 64 and the surface of rod 14, thus effecting a rightward movement of the rod without any substantial slippage thereof relative to the armature.

During the periods when the armature is being moved to the left by spring 60 the wedge surface 64 tends to leave the surface of elements 62 so that the elements have a rolling action on rod 14 and surface 64. The rod tends to maintain its position without moving to the left with the armature.

As long as the solenoid coil is supplied with an alternating current the rod 14 tends to move to the right. This rightward movement may be any distance, as for example one inch or six inches or ten feet, according to the length of time during which the coil receives current, the load which is to be operated by the rod, and the location of external abutments, not shown. When the rod movement is limited by the load or by external abutments the coil can hold the rod in its limited position until the current is disconnected.

The action of each spherical element 62 is illustrated in FIG. 2. In its movement from the full line position toward the dotted line position the spherical element has a rolling engagement with wedge surface 64, the surface of spring-biased ring 66, and the surface of rod 14. The spring-biased ring exerts sufficient force on the spherical element to keep it rollably engaged with surface 64 and the surface of rod 14. The rolling action exerts a rightward acting reaction force on rod 14 which prevents the external load (acting in the arrow 15 direction) from moving the rod in the arrow 15 direction.

During movement of housing 58 from the dotted line position to the full line position the spring 68 maintains the spherical element in tight non-slip engagement with surface 64 and the surface of rod 14. The clutch housing 58, spherical element 62 and rod 14 thus move as a unit from the dotted line position to the full line position. There is no rolling action during this period.

Under the invention the external load is relied on to retract rod 14 leftward to its starting position. When the solenoid is disconnected from its source of current the external load moves rod 14 and armature 54 to the left until anti-friction elements 62 engage the right end surface 70 of sleeve 52. End surface 70 constitutes a fixed abutment means which limits the leftward movement of elements 62 without interfering with the leftward movement of clutch housing 58. When elements 62 are thus halted the wedge surfaces 64 move leftward away from the surfaces of the spherical elements, and the elements then have a free rolling action on the surface of rod 14. The rod can thus be returned to its starting position no matter how far it has been advanced to the right by the solenoid. Surface 70 in effect constitutes a means for disengaging the clutch elements 62 from output member 14. Spring 60 is preferably stronger than spring 68, and therefore causes elements 62 to be released from intimate contact with surface 64 and the surface of rod 14 when elements 62 are limited by surface 70.

FIG. 3 EMBODIMENT

The clutch shown in FIGS. 3 and 4 is intended for use with a solenoid-armature arrangement of the type shown in FIG. 1. In the FIG. 3 construction the clutch housing comprises a channel-shaped member 72 having a web wall 74 affixed to armature 54, and two end walls 76 and 78. Each end wall is provided with openings 80 which form wedge surfaces 84 and axially extending surfaces 86 (FIG. 5). Extending between walls 76 are two one-way clutch elements in the form of rollers 88. Each element has cylindrical reduced end portions 92 disposed within openings 80 of the end walls 76 and 78. The rollers are biased leftwardly by a coil spring 94 and annular plate 96. As shown in FIG. 3, the rollers are at the leftward limits of their movements.

During periods when the solenoid is energized the rollers 88 alternately grip and roll on the surface of rod 14 without contacting member 52. When the solenoid is disconnected the load (in cooperation with spring 60) is effective to cause a leftward movement of rod 14; the rollers 88 thus strike the abutment surface 70 on member 52 so that the rod is enabled to return toward its starting position without interference from clutch elements 88.

The FIG. 3 clutch is similar in a functional sense with the FIG. 1 clutch. Its primary advantage is that it permits output member 14 to have a non-circular cross section, as for example a rectangular or hexagonal cross section.

FIGURE 6 EMBODIMENT

As shown in FIG. 6 the invention comprises a solenoid 99 having a laminated frame 100, a laminated plunger 102, and a coil 104, all preferably constructed as shown generally in U.S. Patent 3,054,935.

Frame 100 is suitably mounted on a base 106 of dielectric material, said base having a cylindrical bore therethrough for slidably accommodating the cylindrical output member 14. Plunger 102 of the solenoid is provided with two spaced ears 108, between which extends a pin 110. The pin is shown in full lines in its non-attracted or rest position and in dotted lines in its operating positions.

The upwardly projecting portion 112 of base 106 is provided with a bore to receive a headed shaft 114. A compression spring 116 is trained about the shaft to urge it and a rectangular clutch plate or element 118 in a leftward direction. Thus, when the solenoid is disconnected the spring causes the clutch plate to assume its full line position extending normal to output member 14. The lower portion of the clutch plate extends freely through a slot 120 in base 106, and is provided with an opening 122 which has a small clearance with respect to member 14. Surface 124 of base 106 is preferably exactly normal to the axis of rod 14 so that clutch plate 118 is insured of taking its illustrated normal position when the coil is disconnected.

When the coil is first energized pin 110 is moved from its FIG. 6 full line position to dotted line position 110a and then to dotted line position 110b. As long as alternating current is supplied to coil 104 the pin vibrates between positions 110a and 110b. When the current is disconnected the pin moves back to its FIG. 6 full line position.

FIG. 7 illustrates the positions taken by the armature, clutch plate and pin during the solenoid-energized periods. During vibratory movement of the armature the pin rocks clutch plate 118 between positions 118a and 118b. During movement from position 118a to position 118b the clutch plate apparently maintains a substantially constant holding engagement with the lower surface of member 14 and a driving engagement with the upper surface of member 14. Movement from position 118b back to position 118a is accomplished by spring 116 without any motion being imparted to member 14 (either leftward or rightward). During each current cycle output member 14 is driven to the right by the incremental distance 127 (until limited by the load or other fixed stop, not shown).

When the solenoid is disconnected spring 116 draws clutch plate 118 leftward to its FIG. 6 full line position in which it is engaged with abutment surface 124. In this position the plate is positioned substantially exactly normal to output member 14 and has no binding or holding action thereon. As a result the external load is enabled to move output member 14 back to its starting position without interference from clutch member 118. Abutment surface 124 performs the same disconnecting or declutching function that is performed by abutment surface 70 in the FIG. 1 and FIG. 3 embodiments.

Each of the illustrated embodiments includes a one-way clutch between the armature and the output member to translate vibratory armature movement into uni-directional forward movement of the output member.

The clutch is in each case constructed to exert a forward-acting holding force on the output member throughout the solenoid-energized periods, whereby the ouput member is enabled to operate against considerable external loads without reliance on inertia effects in the stalled or load limited condition. In each of the illustrated embodiments means is provided to disengage the clutch from the output member when the solenoid is de-energized, whereby to enable the load to return the output member to its starting position.

What is claimed:

1. A power device comprising a solenoid coil; an armature mounted for movement into the coil, and spring means operable to bias the armature out of the coil, whereby energization of the coil is effective to vibrate the armature back and forth along the coil axis; an output member arranged to have uni-directional movement in response to vibratory movement of the armature; reciprocating one way clutch means operatively disposed between the armature and output member for effecting the uni-directional movement; and abutment means positioned to engage the clutch means when said clutch means is beyond the oscillation limits dictated by vibration of the armature, whereby to effect release of the clutch means from the output member in response to deenergization of the solenoid.

2. The combination of claim 1 wherein the clutch means comprises anti-friction rollers.

3. The combination of claim 1 wherein the clutch means comprises a plate-like clutch element having a rockable mounting on the output member.

4. The combination of claim 1 wherein the clutch means comprises anti-friction spheres.

5. A power device comprising a solenoid coil; an armature mounted for movement toward the coil, and spring means operable to bias the armature away from the coil whereby energization of the coil is effective to vibrate the armature; an output member arranged for uni-directional forward movement during vibratory movement of the armature; one way clutch means between the armature and output member comprising a clutch element rockable on the output member surface to effect the forward movement thereof; and abutment means cooperable with the spring means to disengage the clutch means from the output member in response to deenergization of the coil.

6. The combination of claim 5 wherein the clutch means comprises an element having surfaces thereof engaging opposite side surfaces of the output member during the solenoid-energized periods, and the abutment means is located to tilt the clutch element into a position wherein said surfaces are disengaged when the solenoid is deenergized.

7. The combination of claim 5 wherein the clutch means comprises an apertured element, and the output member comprises a rod extending through the element aperture; said element being positioned with its aperture surfaces engaging opposite side surfaces of the rod during the solenoid-energized periods, and the aforementioned abutment means being located to tilt the apertured element to a position wherein the aperture surfaces are disengaged from the rod surfaces during the solenoid-deenergized periods.

8. A power device comprising a solenoid coil; a tubular armature mounted for movement toward the coil, and spring means operable to bias the armature away from the coil, whereby energization of the coil is effective to vibrate the armature; an output member extending through the armature; a one-way clutch carried by the armature comprising a housing having facing wedge surfaces, anti-friction elements disposed between the wedge surfaces and output member, and second spring means urging said elements toward positions of tight engagement with said surfaces and output member; and abutment means positioned to engage the anti-friction elements when the elements are beyond their oscillation limits as dictated by the vibration of the armature, whereby to effect release of the elements from the output member in response to deenergization of the solenoid.

9. The combination of claim 8 wherein the anti-friction elements take the form of rollers.

10. The combination of claim 8 wherein the anti-friction elements take the form of spheres.

References Cited by the Examiner

UNITED STATES PATENTS

| | | | |
|---|---|---|---|
| 1,615,604 | 1/1927 | Wahl | 310—21 |
| 1,622,255 | 3/1927 | Ruckelhaus | 310—21 |

ORIS L. RADER, *Primary Examiner.*

C. W. DAWSON, *Assistant Examiner.*